US009519148B2

(12) United States Patent
Masuda et al.

(10) Patent No.: US 9,519,148 B2
(45) Date of Patent: Dec. 13, 2016

(54) VEHICULAR DISPLAY DEVICE (71) Applicant: YAZAKI CORPORATION, Tokyo (JP)

(72) Inventors: Akira Masuda, Shizuoka (JP); Takeshi Iwamoto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 321 days.

(21) Appl. No.: 14/036,306

(22) Filed: Sep. 25, 2013

(65) Prior Publication Data
US 2014/0091988 A1    Apr. 3, 2014

(30) Foreign Application Priority Data
Sep. 28, 2012   (JP) .................................. 2012-217574

(51) Int. Cl.
G02B 27/01      (2006.01)
(52) U.S. Cl.
CPC ....... G02B 27/0179 (2013.01); G02B 27/0149 (2013.01); G02B 2027/0118 (2013.01); G02B 2027/0159 (2013.01)
(58) Field of Classification Search
CPC . G02B 27/01; G02B 27/0179; G02B 27/0149; G02B 2027/0118; G02B 2027/0159; B60K 35/00
See application file for complete search history.

(56) References Cited

U.S. PATENT DOCUMENTS

| 5,510,983 A | 4/1996 | Iino | |
|---|---|---|---|
| 2009/0140845 A1* | 6/2009 | Hioki | B60K 35/00 340/425.5 |

(Continued)

FOREIGN PATENT DOCUMENTS

| JP | 5-18948 U | 3/1993 |
|---|---|---|
| JP | 6-144082 A | 5/1994 |

(Continued)

OTHER PUBLICATIONS

Japanese Office Action for the related Japanese Patent Application No. 2012-217574 dated Jul. 19, 2016.

(Continued)

Primary Examiner — Quan-Zhen Wang
Assistant Examiner — Xuemei Zheng
(74) Attorney, Agent, or Firm — Kenealy Vaidya LLP (57) ABSTRACT A vehicular display device includes a display unit that displays visible information, a light projection unit that includes a reflection member which reflects light containing the visible information displayed on the display unit and projects the reflected light to a predetermined observation region to display the visible information as a virtual image, a light path adjustment mechanism that switches an imaging position of the virtual image between at least two positions, an illuminance detection unit that detects an intensity of external light affecting visibility of the virtual image, and an imaging position control unit that controls the light path adjustment mechanism depending upon the illuminance and changes the imaging position to a first position, at which the virtual image is less influenced by the external light, or to a second position, at which the virtual image is easily influenced by the external light.

4 Claims, 5 Drawing Sheets (56) References Cited

U.S. PATENT DOCUMENTS

| 2012/0050139 | A1* | 3/2012 | Wang | G02B 27/01 |
| | | | | 345/7 |
| 2012/0320207 | A1* | 12/2012 | Toyofuku | B60R 1/00 |
| | | | | 348/148 |
| 2013/0258693 | A1* | 10/2013 | Hatakeyama | B60K 35/00 |
| | | | | 362/509 |

FOREIGN PATENT DOCUMENTS

| JP | 6-50952 U | 7/1994 |
| JP | 7-89371 A | 4/1995 |
| JP | 2003-48453 A | 2/2003 |
| JP | 2006-65091 A | 3/2006 |
| JP | 2010-208632 A | 9/2010 |

OTHER PUBLICATIONS

Japanese Office Action for the related Japanese Patent Application No. 2012-217574 dated Sep. 20, 2016 (with English Translation).

* cited by examiner

VEHICULAR DISPLAY DEVICE

CROSS REFERENCE TO RELATED APPLICATION

This application is based on Japanese Patent Applications No. 2012-217574 filed on Sep. 28, 2012, the contents of which are incorporated herein by reference.

BACKGROUND OF THE INVENTION

1. Technical Field

The present invention relates to a vehicular display device having a display unit for displaying visible information and a light projection unit for reflecting light containing the visible information displayed on the display unit by a predetermined light reflection member to project the light to a predetermined observation region, and displaying the visible information as a virtual image.

2. Background Art

In a vehicular display device, a head-up display (HUD) having good visibility may be used to allow a driver to rapidly recognize information having, for example, a small information amount but a high degree of urgency.

The vehicular head-up display guides a light image, which contains visible information generally displayed on a display unit of a display device main body, onto a windshield (front glass) of a vehicle or a light reflection member, which is referred to as combiner, and projects an image of the reflected light to be seen by eyes of the driver.

Therefore, when the driver sees the front at a normal driving posture, the driver can visually recognize not only front scenery and a portion of the vehicle, which are transmitted and seen through the windshield, but also the visible information projected by the head-up display. The visible information which is visually recognized by the driver is imaged as a virtual image in front of a surface of the windshield, for example, at a several meter position distant from a viewpoint, and thus the driver can simultaneously recognize the front scenery and the display contents of the head-up display without focusing the eyes during driving.

This head-up display device is generally configured so that a device main body thereof is disposed in an instrument panel of the vehicle. The light of the visible information which is displayed on the display unit in the device main body is projected towards a projection area, such as a windshield or a combiner, via a light path including a reflection member, such as an enlarging system mirror, so that a virtual image is imaged at a predetermined position distant from the viewpoint of the driver, when viewed from the viewpoint.

The related art of the vehicular head-up display device is disclosed in JP-UM-H06-050952, for example. In JP-UM-H06-050952, there is proposed a head-up display device in which, in order to enhance visibility of information display, brilliance of a background of an information display portion is properly measured and correspondingly brilliance of the information display is optimally controlled. Also, there is disclosed a technique for integrally forming and arranging a light sensor, a light sensor driving transmission circuit and a solar cell in a room mirror.

In general, a vehicular head-up display device projects a light image so that a virtual image, which is seen from a viewpoint position of a driver, is imaged in front of a front windshield (front glass) of a vehicle. Thus, when seeing the front through the front windshield, the driver, who drives the vehicle, can visually recognize as a virtual image display contents of the head-up display device with overlapped with an object, such as front scenery or a portion (a bonnet or the like) of the vehicle.

However, for example, in a situation where a strong external light from the sun is arrived, such as daytime of a clear day, a light intensity of the external light becomes larger than that of the virtual image displayed by the head-up display device, and as a result, display of the virtual image is difficult to be visually recognized due to the influence of the external light. Therefore, as disclosed, for example, in JP-UM-H06-050952, optimally controlling brilliance of the information display may be effective to improve visibility.

Nevertheless, because the head-up display device performs display by the projected virtual image, when the intensity of the external light is very large, such as daytime of a clear day, the influence of the external light is too strong even if the light intensity of the virtual image is increased. As a result, it is impossible to ensure a sufficient visibility.

Therefore, it may be also contemplated to project the virtual image to a location other than the front of the front windshield in order to avoid the influence of the external light. However, if the virtual image is projected to such a location, the driver has to increase movement of the viewpoint or needs focusing of the eyes to see the virtual image, and thus a function as the head-up display device cannot be sufficiently exhibited.

Accordingly, the present invention has been made keeping in mind the above problem, and an object of the invention is to provide a projection-type vehicular display device, in which a sufficient visibility can be ensured even upon an environment, where the influence of external light is large, and also, the need for viewpoint movement and focusing of a driver can be reduced.

SUMMARY OF THE INVENTION

In order to achieve the above object, a vehicular display device of the present invention has the following features (1) to (4).

According to the vehicular display device of the above configuration (1), a position to which the virtual image is projected can be automatically changed depending upon the intensity of the influence of the external light. In other words, the first position, at which the virtual image is less influenced by the external light, and the second position, at which the virtual image is easily influenced by the external light, can be separately used, thereby ensuring a sufficient visibility.

According to the vehicular display device of the above configuration (2), the imaging position of the virtual image can be automatically returned to the second position if the illuminance becomes later than the predetermined value even after the imaging position of the virtual image has been switched to the first position, at which the virtual image is less influenced by the external light, thereby ensuring a visibility and also inhibiting opportunities for viewpoint movement and focusing of a driver to a minimum.

According to the vehicular display device of the above configuration (3), the virtual image is imaged at the first position which is located below the lower end of the front windshield of the vehicle, and as a result, the influence of the external light can be sufficiently reduced, thereby easily ensuring the visibility.

According to the vehicular display device of the above configuration (4), an information related to switching of the position to which the virtual image is projected can be easily delivered to the driver.

According to the vehicular display device of the present invention, a sufficient visibility can be ensured even upon an environment, where the influence of the external light is large, and also, the need for viewpoint movement and focusing of a driver can be reduced. Therefore, the vehicular display device is useful as a head-up display device for a vehicle.

In the foregoing, the present invention has been briefly described. Also, details of the present invention will be further apparent, when modes (hereinafter, referred to as "embodiments") for embodying the invention as described below are thoroughly read with reference to the accompanying drawings.

DETAILED DESCRIPTION OF THE EXEMPLARY EMBODIMENTS

Specific illustrative embodiments relating to a vehicular display device of the present invention will be now described with reference to the accompanying drawings.

<Configuration of Electric Circuit>

Figure 1:
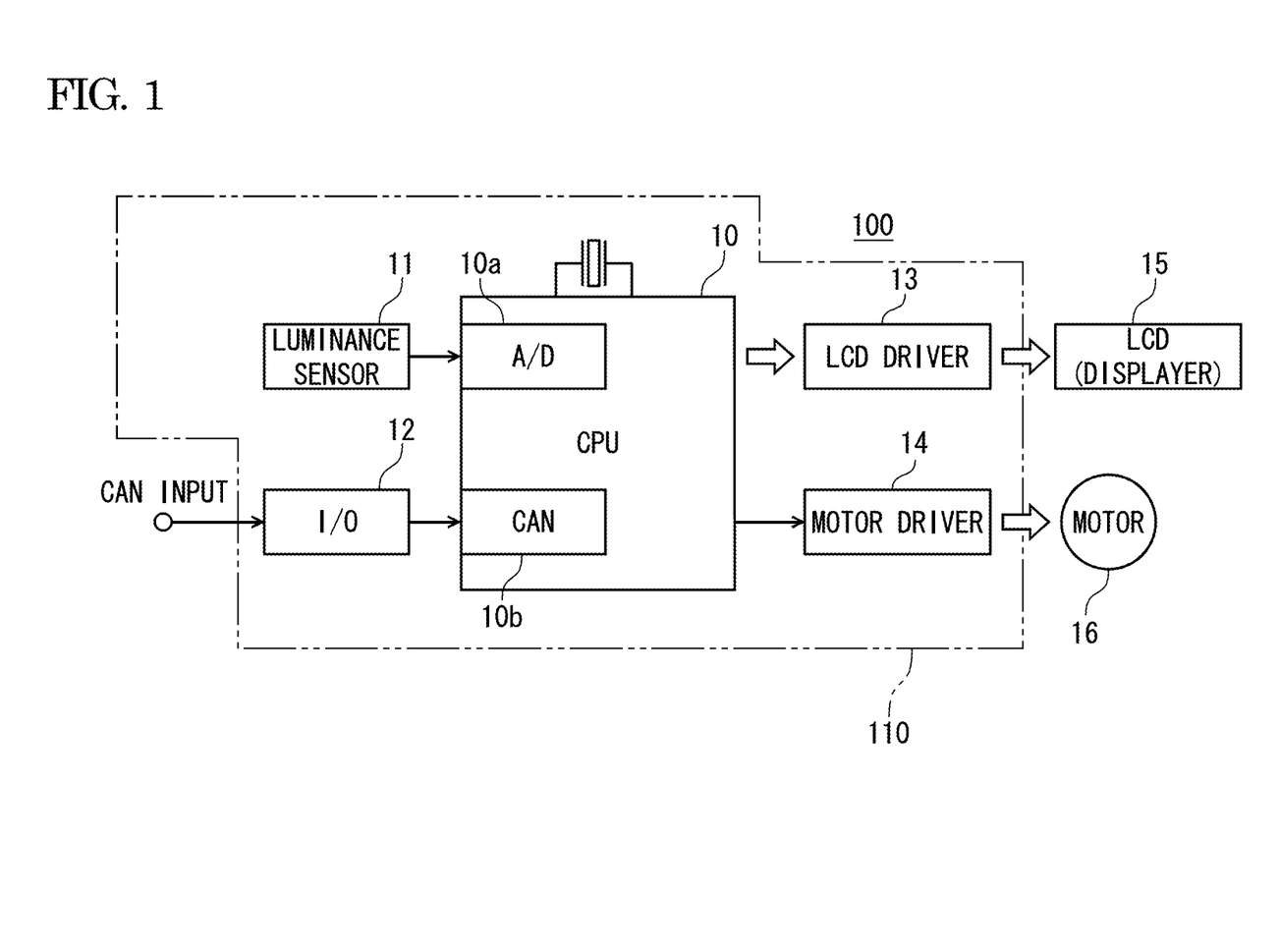
FIG. 1 is a block diagram showing a configuration example of an electric circuit of a HUD device main body according to an embodiment.

A configuration example of an electric circuit of a HUD (head-up display) device main body 100 according to the present embodiment is shown in FIG. 1. As shown in FIG. 1, the electric circuit of the HUD device main body 100 includes a control circuit 110, a liquid crystal displayer (LCD) 15 and an electric motor 16, and the liquid crystal displayer 15 and the electric motor 16 are connected to the control circuit 110.

The control circuit 110 includes a microcomputer (CPU) 10, an illuminance sensor 11, an input/output interface (I/O) 12, a LCD driver 13, and a motor driver 14.

The microcomputer 10 implements various functions required by the HUD device main body 100, by executing a pre-installed program. Also, the microcomputer 10 has an A/D conversion processing unit 10a and a CAN communication processing unit 10b built therein. The A/D conversion processing unit 10a has a function of converting an inputted analog signal into a digital signal by sampling and quantization. The CAN communication processing unit 10b has a processing function corresponding to CAN (Controller Area Network) communication standard.

The illuminance sensor 11 can output an analog electrical signal corresponding to an intensity (illuminance) of external light, which affects visibility of the display of the HUD.

The input/output interface 12 serves as an interface for connecting a CAN communication network on a vehicle with the HUD device main body 100. In a general vehicle, various electronic control units (ECU) are connected to the CAN communication network. The HUD device main body 100, if required, can perform a data communication with other electronic control units (ECU) on the vehicle via the CAN communication network. By this communication, the HUD device main body 100 can acquire information of the vehicle, such as cooling water temperature, driving speed (vehicle speed), and fuel level.

An output of the LCD driver 13 is connected to the liquid crystal displayer 15. The microcomputer 10 can control the display contents of the liquid crystal displayer 15 via the LCD driver 13. The liquid crystal displayer 15 can display a variety of information as visible information by control of the microcomputer 10. The liquid crystal displayer 15 is a transmissive display and has a back light (not shown). By illumination light of the back light, the display contents of the liquid crystal displayer 15 can be projected to other locations.

An output of the motor driver 14 is connected to the electric motor 16. The microcomputer 15 can drive the electric motor 16 via the motor driver 14. By driving the electric motor 16, a light path of light projected from the liquid crystal displayer 15 is switched, thereby switching a position on which an image to be displayed is imaged.

<Description of Arrangement of HUD Device and Light Path>

Figure 2:
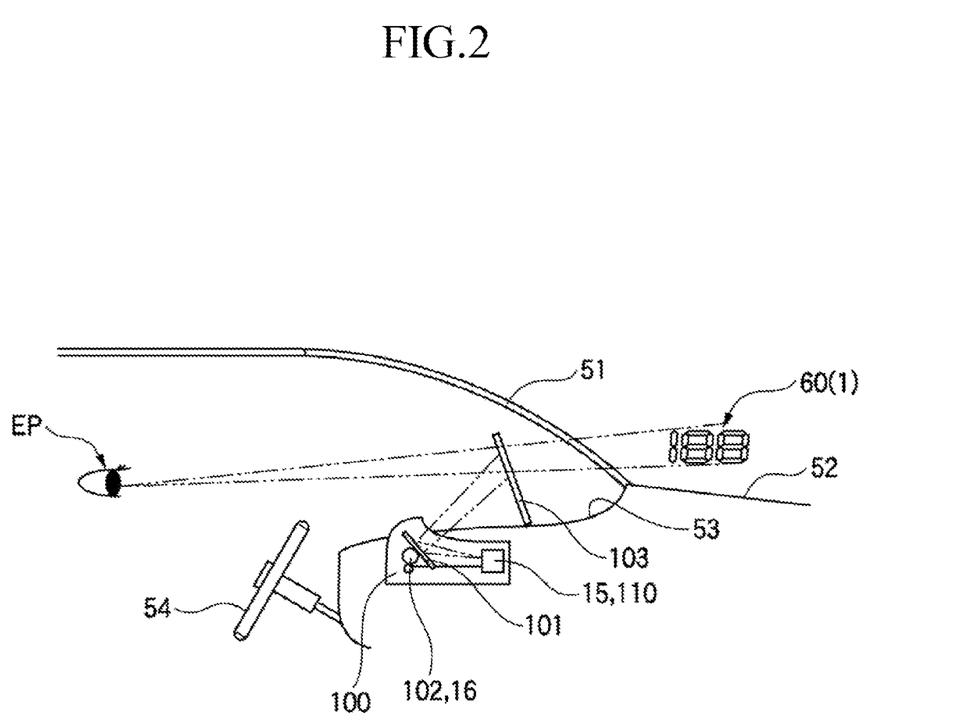
FIG. 2 is a sectional view showing a specific example of an arrangement of the HUD device and a light path thereof when viewed from the side of a vehicle.
Figure 3:
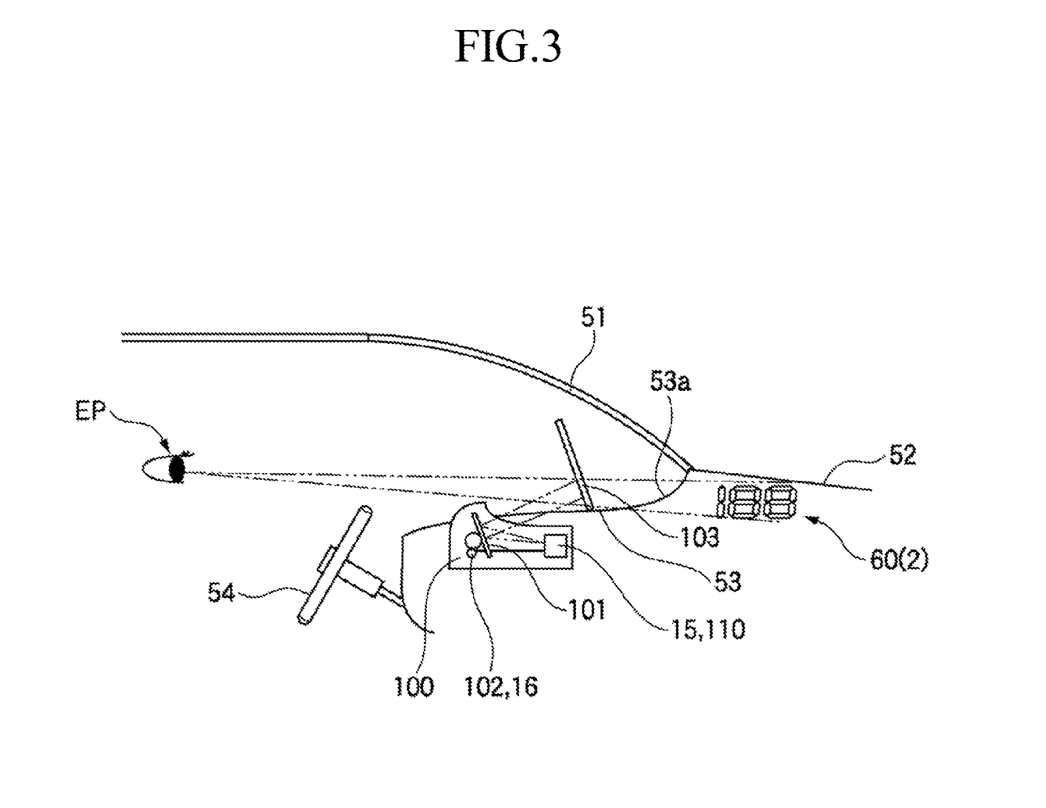
FIG. 3 is a sectional view showing a state where a display position of a virtual image in the HUD device shown in FIG. 2 is switched.

A specific example of an arrangement of the HUD device and a light path thereof when viewed from the side of the vehicle is shown in FIG. 2. In addition, a state where a display position of a virtual image in the HUD device shown in FIG. 2 is switched is shown in FIG. 3. In FIGS. 2 and 3, the right side represents a forward direction in a travelling direction of the vehicle, and the left side represents a backward direction in the travelling direction of the vehicle.

As shown in FIG. 2, a general vehicle has, on the place in front of the driver's seat, a front windshield (window glass) 51, a bonnet 52, an instrument panel 53, a steering wheel 54 and the like.

The HUD device main body 100 is disposed below the instrument panel 53 as shown in FIG. 2, and only a portion thereof is exposed through an opening of the instrument panel 53. A displaying light can be illuminated toward the outside of the instrument panel 53 through the opening.

As shown in FIG. 2, a thin-plate-shaped combiner 103 is installed on the instrument panel 53 while being erected therefrom in a state of being slightly inclined. The combiner 103 is an optical element and has a function of reflecting, transmitting and combining light. In other words, the combiner 103 reflects light incident on a left surface thereof to guide a viewpoint position EP and transmits light incident on a right surface thereof to guide the viewpoint position EP. Thus, a light, which is entered from the outside of the front windshield 51 and then transmitted through the combiner 103, and a light, which is emitted from the HUD device main body 100 and then reflected on the combiner 103, are combined and then are imaged at the viewpoint potion EP.

As shown in FIG. 2, the liquid crystal displayer 15 is built in the HUD device main body 100. The display contents of the liquid crystal displayer 15 are illuminated by the back light as described above and are projected toward the left side. This projection light is reflected on a surface of a mirror 101 disposed inside the HUD device main body 100 and is directed toward a surface of the combiner 103 disposed outside the HUD device main body 100.

Therefore, the projection light corresponding to the display contents of the liquid crystal displayer 15 is imaged at the viewpoint position EP through a light path, which passes through the liquid crystal displayer 15, the mirror 101, and the combiner 103 in this order. In fact, because an image reflected by the combiner 103 and the mirror 101 is imaged, an image which is seen by a driver at the viewpoint position EP appears as if the image is present at a position of a virtual image 60(1) in front of the combiner 103 and the front windshield 51. For example, the position of the virtual image 60(1) may be a position of about 2 m in front of the front windshield 51.

As shown in FIG. 2, the mirror 101 inside the HUD device main body 100 is supported via an angle adjustment mechanism 102. Also, the angle adjustment mechanism 102 is connected to the electric motor 16 as described above. As a result, inclination of the mirror 101 can be adjusted by driving the electric motor 16. In fact, the inclination of the mirror 101 can be adjusted in a clockwise direction and a counterclockwise direction about a supporting axis in a direction perpendicular to the paper plane of FIGS. 2 and 3.

In the present embodiment, the control circuit 110 drives the electric motor 16 to adjust the inclination of the mirror 101, and as a result, the light path can be switched so that a virtual image which is seen by the driver at the viewpoint position EP can be moved to any one position of the position of the virtual image 60(1) shown in FIG. 2 and a position of a virtual image 60(2) shown in FIG. 3.

<Description of Position of Virtual Image>

When a virtual image which is seen by the driver is positioned at the position of the virtual image 60(1) shown in FIG. 2, front scenery (or the bonnet 52), which is transmitted and seen through the front windshield 51, and the display contents of the liquid crystal displayer 15 are overlapped with each other and seen as a virtual image. Therefore, when checking the display contents of the liquid crystal displayer 15, the driver hardly needs to move the viewpoint and also does not need focusing of the eyes, thereby obtaining a very good visibility. However, when external light, such sunlight, is strong, light intensity of the virtual image 60(1) is smaller than that of the external light, and as a result, the visibility can be extremely reduced.

Meanwhile, the virtual image 60(2) shown in FIG. 3 is positioned at a position where the virtual image 60(2) is overlapped with a portion 53a of the instrument panel 53 below a lower end of the front windshield 51 when viewed from the viewpoint position EP. The instrument panel 53 is formed by a structure or a color which is difficult to reflect the external light. Therefore, when a virtual image which is seen by the driver is positioned at the position of the virtual image 60(2) shown in FIG. 3, light intensity of the virtual image 60(2) is sufficiently larger than that of the external light to be less influenced by the external light, thereby ensuring a sufficient visibility. However, when the driver refers to the display contents of the liquid crystal displayer 15 at the position of the virtual image 60(2), the driver has to move his sight line slightly downward from a normal driving state where the driver sees the front of the front windshield 51, and as a result, the visibility is sacrificed somewhat, as compared to when seeing the position of the virtual image 60(1).

<Specific Examples of Display Contents>

Figure 4:
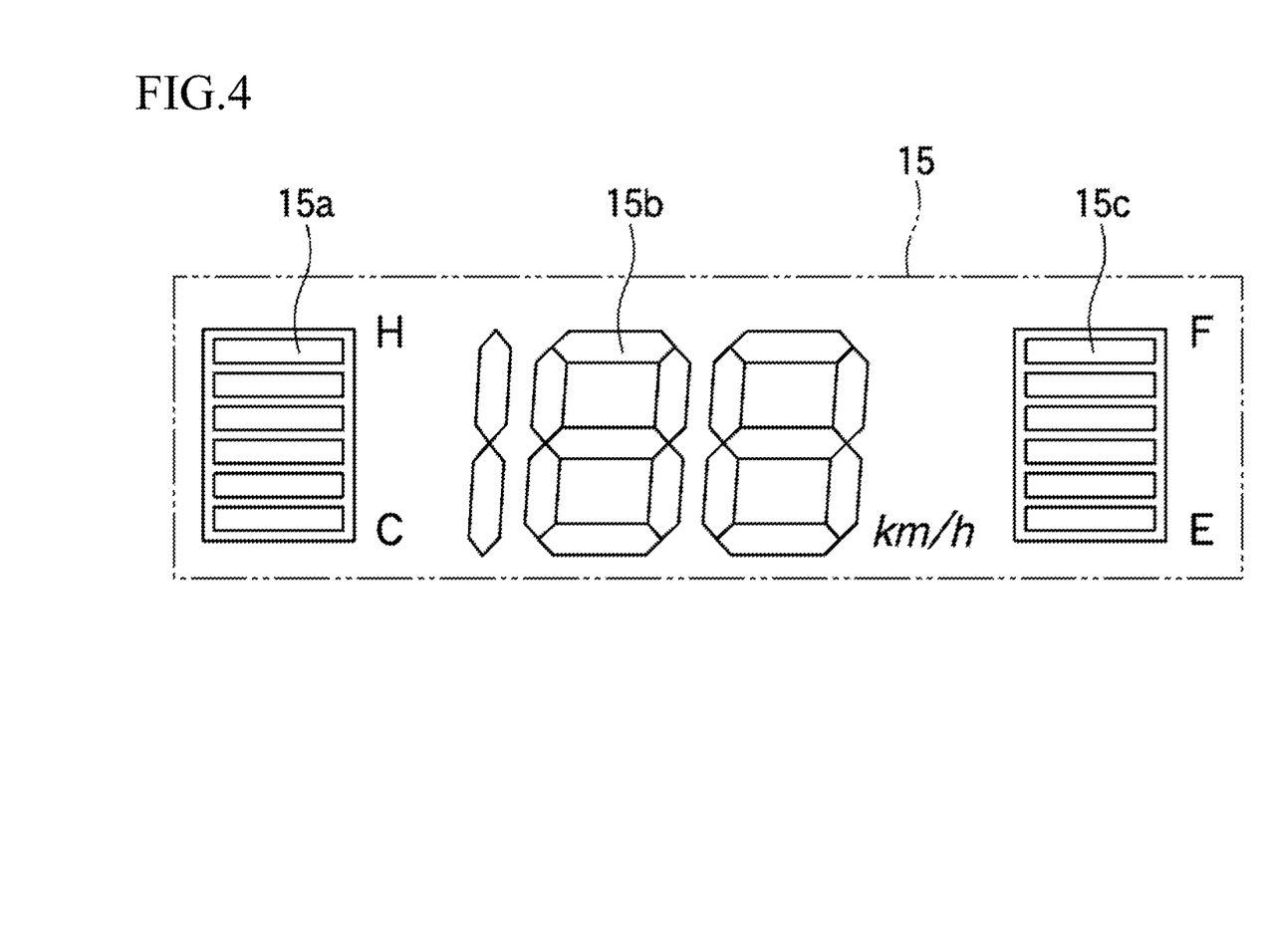
FIG. 4 is a front view showing the exterior of a displayer included in the HUD device shown in FIG. 2.

A specific example of the exterior of the liquid crystal displayer 15 included in the HUD device shown in FIG. 2 is shown in FIG. 4. As shown in FIG. 4, the liquid crystal displayer 15 includes a thermometer displaying portion 15a, a speedometer displaying portion 15b, and a fuel gauge displaying portion 15c.

The thermometer displaying portion 15a can represent high (H) and low (C) of temperature as a bar graph by a combination of displaying/non-displaying or displaying colors of a plurality of display segments. The speedometer displaying portion 15b can represent a speed (km/h) as a three-digit number by a combination of displaying/non-displaying of a plurality of display segments. The fuel gauge displaying portion 15c can represent a fuel level as a bar graph by a combination of displaying/non-displaying of a plurality of display segments.

<Operation of Control Circuit 110>

Figure 5:
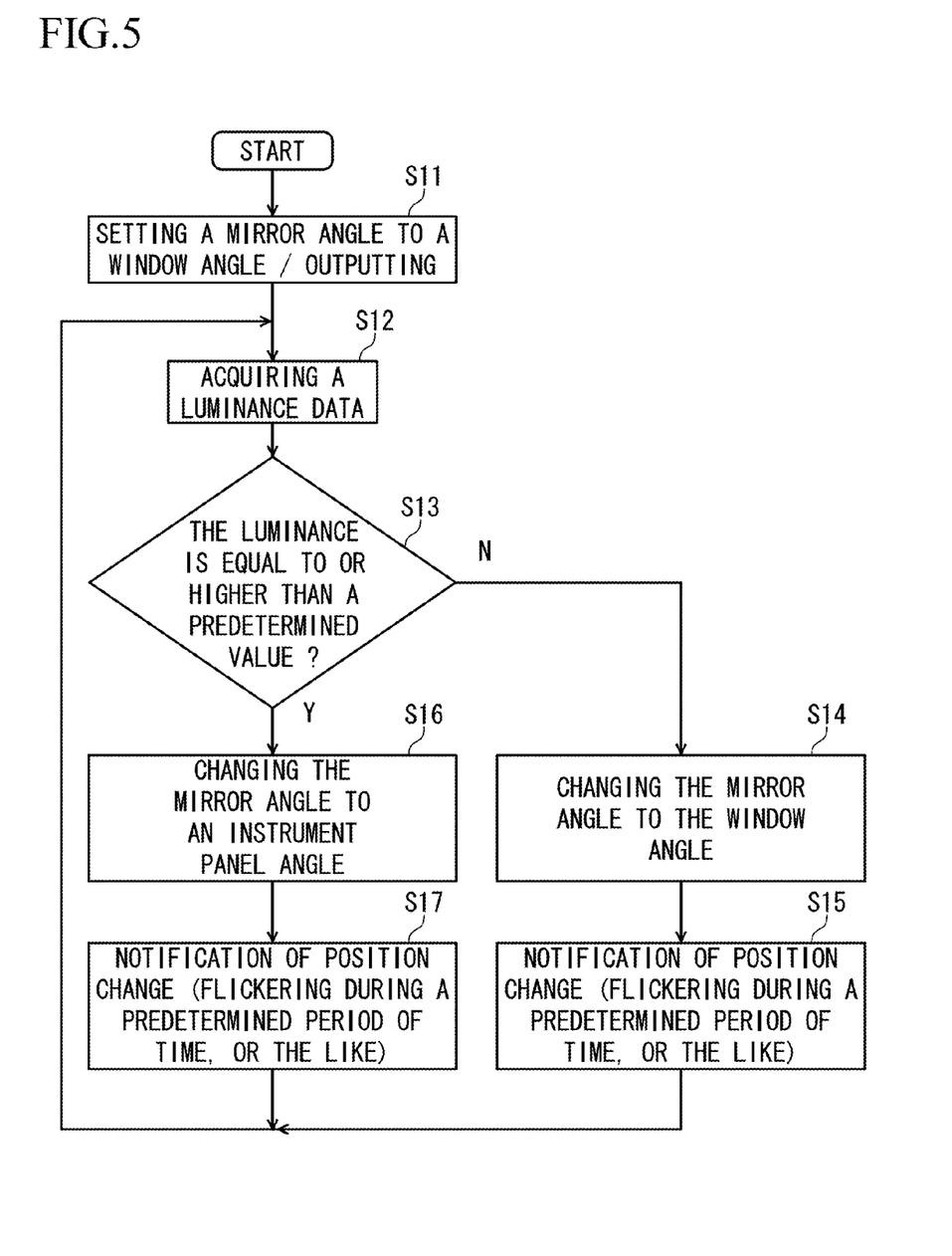
FIG. 5 is a flow chart showing main operations of a control circuit shown in FIG. 1.

Main operations of the control circuit 110 shown in FIG. 1 are shown in FIG. 5. As the microcomputer 10 shown in FIG. 1 executes a predetermined program, operations shown in FIG. 5 are implemented. Each of steps shown in FIG. 5 will be described below.

If a power of the control circuit 110 is turned on, the microcomputer 10 executes a predetermined initialization process, and then in a step S11, positions as an initial state a position of a virtual image, which is displayed by the HUD device main body 100, to the position of the virtual image 60(1) shown in FIG. 2. Specifically, the electric motor 16 is driven to adjust inclination of the mirror 101 to 'a window angle (a state of FIG. 2) θ2', in which a light path extending between the viewpoint position EP and the virtual image 60 passes through the front windshield 51 which is a window. Herein, the position of the virtual image 60(1) in the state of FIG. 2 refers to as a second position.

In a step S12, the microcomputer 10 converts an analog signal, which is outputted by the illuminance sensor 11, to a digital signal, thereby acquiring the latest illuminance data. In other words, intensity of external light, such as sunlight, which affects visibility of the virtual image 60 displayed by the HUD device main body 100 is detected as an illuminance data.

In a step S13 the microcomputer 10 compares the illuminance date detected in S12 to a predetermined illuminance threshold value. If the illuminance is equal to or higher than the threshold value, the procedure proceeds from S13 to S16, and if the illuminance is lower than the threshold value, the procedure proceeds to S14.

In a step 14, the microcomputer 10 drives the electric motor 16 to adjust inclination of the mirror 101 to 'the window angle (the state of FIG. 2) θ2', in which the light path extending between the viewpoint position EP and the virtual image 60 passes through the front windshield 51 which is a window. If immediately after turning on the power, the mirror 101 has already positioned at the corresponding angle (θ2) in S11, and thus the angle adjustment is not performed. If S14 is performed after adjusting the mirror 101 to the other angle (θ1), the electric motor 16 is driven to adjust inclination of the mirror 101 to 'the window angle θ2', so that the virtual image 60 is returned to the second position.

In a step S15, the microcomputer 10 temporarily controls the display of the liquid crystal displayer 15 to a special state via the LCD driver 13. Specifically, the display is controlled such that the entire or a portion of the display is periodically alternately turned on and off to be repeatedly flickered only during a predetermined period of time (e.g., during 5 seconds). Due to this special display, the driver can easily recognize that the display position of the virtual image 60 has been switched.

In a step S16, the microcomputer 10 drives the electric motor 16 to adjust inclination of the mirror 101 to 'an instrument panel angle (a state of FIG. 3) θ1', in which the light path extending between the viewpoint position EP and the virtual image 60 passes through the portion 53*a* of the instrument panel below the lower end of the front windshield 51. Herein, the position of the virtual image 60(2) in the state of FIG. 3 refers to as a first position. Meanwhile, when the inclination of the mirror 101 has already been set to 'the instrument panel angle θ1', the angle adjustment is not performed in S16.

In a step S17, the microcomputer 10 temporarily controls the display of the liquid crystal displayer 15 to a special state via the LCD driver 13. Specifically, the display is controlled such that the entire or a portion of the display is periodically alternately turned on and off to be repeatedly flickered only during a predetermined period of time (e.g., during 5 seconds). Due to this special display, the driver can easily recognize that the display position of the virtual image 60 has been switched.

<Description of Characteristic Operations>

As the control circuit 110 performs the control shown in FIG. 5, the results described below are obtained.

In a normal operation state, the position of the virtual image 60 is positioned to the second position (the state of FIG. 2) in the step S11 or S14 of FIG. 5. Therefore, similarly to the case of general HUD devices, the driver can simultaneously see front scenery, which is transmitted and seen through the front windshield 51, and the display contents of the liquid crystal displayer 15 in an overlapped state, thereby obtaining a higher visibility.

For example, the virtual image 60(1) is difficult to be seen if the external light has become strong, such as by irradiation of direct sunlight on a clear day. In this case, the position of the virtual image 60 is, however, automatically switched to the first position in the step S16, because the illuminance of the external light detected by the illuminance sensor 11 exceeds a threshold value. When the driver sees the virtual image 60(2) at the first position, reflection of the external light by the instrument panel 53*a* is less, and thus seeing the virtual image 60(2) corresponding to the display contents of the liquid crystal displayer 15 is less influenced by the external light, thereby obtaining a sufficient visibility.

In addition, if the illuminance of the incident external light is weakened after the position of the virtual image 60 has been switched to the first position (the state of FIG. 3), the procedure proceeds from the step S13 to the step S14, and as a result, the position of the virtual image 60 is automatically returned again to the second position (the state of FIG. 2) in the step S14. In this case, the illuminance of the external light has been already weakened, and thus a higher visibility can be obtained when the driver sees the virtual image 60(2). In addition, when seeing the virtual image 60(2), the driver does not need to move his sight line from a normal driving state.

[Modification Possibility]

<Notification of Position Switching>

In the control shown in FIG. 5, although the display is flickered during a predetermined period of time in S15 and S17 to notify switching of the position of the virtual image 60 to the driver, brilliance of the display, instead of flickering, may be controlled to be temporarily increased. A region, which is flickered, or a region, whose brilliance is increased, may be the entire of the display, or may be limited to only a portion of the display. In addition, when switching the position of the virtual image 60, visible information representing the switching direction may be displayed on a portion other than the virtual image 60, for example, on a display section of a general meter unit (instrument panel device).

<Display Position of Virtual Image 60>

In the example shown in FIG. 3, the position (the first position) of the virtual image 60(2) is assigned to a position overlapped with the instrument panel 53*a* when viewed from the viewpoint position EP. However, the virtual image 60(2) may disposed at a position overlapped with a member other than the instrument panel 53 if the position is located below the lower end of the front windshield 51. Namely, because such a position is a dark portion which is less influenced by the external light when viewed from the viewpoint position EP, a sufficient visibility for the virtual image 60(2) can be ensured.

<Mechanism for Switching Position of Virtual Image 60>

In the HUD device main body 100 shown in FIGS. 2 and 3, the angle adjustment mechanism 102 supporting the mirror 101 is driven so that the light path is changed and the position of the virtual image 60 is switched. For this mechanism, inclination of other optical members, such as the combiner 103, instead of the mirror 101, may be adjusted. Alternatively, the entire housing of the HUD device main body 100 may be adjusted to be inclined relative to a vehicle, thereby switching the light path.

Followings are explanation of the embodiment the present invention.

(1) The vehicular display device (100, 103) shown in FIGS. 1 to 3 includes a display unit (15) that displays visible information and a light projection unit (101, 103) that includes a reflection member (101) which reflects light containing the visible information displayed on the display unit and projects the reflected light to a predetermined observation region (103 or EP) to displays the visible information as a virtual image (60).

Also, the vehicular display devices includes a light path adjustment mechanism (102, 16) that switches an imaging position of the virtual image visually recognizable at the observation region between at least two positions arranged in an upward and downward direction; an illuminance detection unit (11) that detects an intensity of external light affecting visibility of the virtual image; and an imaging position control unit (10) that automatically controls the light path adjustment mechanism depending upon a magnitude of the illuminance detected by the illuminance detection unit and changes the imaging position of the virtual image to a first position (60(2)), at which the virtual image is less influenced by the external light, or to a second position (60(1)), at which the virtual image is easily influenced by the external light.

(2) Also, the imaging position control unit (10), as shown in FIG. 5, changes the imaging position of the virtual image to the first position, at which the virtual image is less influenced by the external light, when an illuminance equal to or higher than a predetermined value is detected while the imaging position of the virtual image is located at the second position, at which the virtual image is easily influenced by the external light (S13, S16), and changes the imaging position of the virtual image to the second position when a state, where the illuminance becomes lower than the predetermined value, is detected while the imaging position of the virtual image is located at the first position (S13, S14).

(3) Further, the imaging position control unit changes the imaging position of the virtual image to the first position (the position of 60(2)), which is located below a lower end of a front windshield (51) of a vehicle as shown in FIG. 3, when an illuminance equal to or higher than a predetermined value is detected while the imaging position of the virtual image is located at the second position, at which the virtual image is easily influenced by the external light.

(4) In addition, accompanying with switching of the imaging position of the virtual image, the imaging position control unit, as shown in FIG. 5, at least temporarily reflects an information indicating the changing of the position to contents of the visible information to be displayed (S15, S17).

What is claimed is:

1. A vehicular display device for use with a vehicle that has an instrument panel, the vehicular display device comprising:
   a display unit that displays visible information;
   a light projection unit that includes a reflection member which reflects light containing the visible information displayed on the display unit and projects the reflected light to a predetermined observation region to display the visible information as a virtual image;
   a light path adjustment mechanism that switches an imaging position of the virtual image visually recognizable at the observation region between at least two positions arranged in an upward and downward direction;
   an illuminance detection unit that detects an intensity of external light affecting visibility of the virtual image; and
   an imaging position control unit that controls the light path adjustment mechanism to change the imaging position of the virtual image to a first position that overlaps with a portion of the instrument panel, at which the virtual image is less influenced by the external light, or to a second position that is spaced away from the instrument panel, at which the virtual image is easily influenced by the external light, depending upon a magnitude of the illuminance detected by the illuminance detection unit.

2. The vehicular display device according to claim 1, wherein the imaging position control unit changes the imaging position of the virtual image to the first position, at which the virtual image is less influenced by the external light, when an illuminance equal to or higher than a predetermined value is detected while the imaging position of the virtual image is located at the second position, at which the virtual image is easily influenced by the external light, and changes the imaging position of the virtual image to the second position when a state, where the illuminance becomes lower than the predetermined value, is detected while the imaging position of the virtual image is located at the first position.

3. The vehicular display device according to claim 1, wherein the imaging position control unit changes the imaging position of the virtual image to the first position, which is located below a lower end of a front windshield of a vehicle, when an illuminance equal to or higher than a predetermined value is detected while the imaging position of the virtual image is located at the second position, at which the virtual image is easily influenced by the external light.

4. The vehicular display device according to claim 1, wherein accompanying with changing of the imaging position of the virtual image, the imaging position control unit at least temporarily reflects an information indicating the changing of the position to contents of the visible information to be displayed.

* * * * *